(12) United States Patent
Sanzone et al.

(10) Patent No.: US 10,002,099 B2
(45) Date of Patent: Jun. 19, 2018

(54) ARBITRATED ACCESS TO RESOURCES AMONG MULTIPLE DEVICES

(71) Applicant: Cavium, Inc., San Jose, CA (US)

(72) Inventors: Robert A. Sanzone, Hudson, MA (US); Wilson P. Snyder, II, Holliston, MA (US); Richard E. Kessler, Northborough, MA (US)

(73) Assignee: Cavium, Inc., San Jose, CA (US)

( * ) Notice: Subject to any disclaimer, the term of this patent is extended or adjusted under 35 U.S.C. 154(b) by 710 days.

(21) Appl. No.: 14/540,436

(22) Filed: Nov. 13, 2014

(65) Prior Publication Data

US 2016/0140071 A1 May 19, 2016

(51) Int. Cl.
*G06F 13/364* (2006.01)
*G06F 13/40* (2006.01)
*G06F 13/16* (2006.01)
*G06F 13/362* (2006.01)

(52) U.S. Cl.
CPC ...... *G06F 13/4031* (2013.01); *G06F 13/1642* (2013.01); *G06F 13/362* (2013.01); *G06F 13/364* (2013.01)

(58) Field of Classification Search
CPC ... G06F 13/364; G06F 13/362; G06F 13/3625
USPC ........................................................ 710/110
See application file for complete search history.

(56) References Cited

U.S. PATENT DOCUMENTS

| 5,862,338 | A | * | 1/1999 | Walker | H04L 49/351 709/224 |
|---|---|---|---|---|---|
| 6,363,445 | B1 | * | 3/2002 | Jeddeloh | G06F 13/362 710/107 |
| 6,546,439 | B1 | * | 4/2003 | Strongin | G06T 1/60 710/52 |
| 6,581,147 | B1 | * | 6/2003 | Rovati | G06F 13/1673 710/52 |
| 8,849,891 | B1 | * | 9/2014 | Suchter | G06F 9/5038 709/202 |
| 2002/0012341 | A1 | * | 1/2002 | Battle | H04L 12/18 370/378 |
| 2010/0049942 | A1 | * | 2/2010 | Kim | G06F 15/17375 712/29 |

* cited by examiner

*Primary Examiner* — Titus Wong
(74) *Attorney, Agent, or Firm* — Hamilton, Brook, Smith & Reynolds, P.C.

(57) ABSTRACT

An arbiter circuit manages and enforces arbitration and quality of service (QOS) among multiple devices accessing a resource, such as a memory. The arbiter circuit receives requests from a number of devices to use resources of a bridge connecting to a memory, and maintains a count of bridge resources available on a per-device and per-bus basis. The arbiter circuit operates to select a next one of the requests to grant a bridge resource based on the device originating the request, a count of the per-device resources available, and a count of the resources available to the bus connecting the device to the bridge.

22 Claims, 5 Drawing Sheets

| ORDER | CREDITS |
|---|---|
| DEV0 | 64 |
| DEV1 | 12 |
| DEV2 | 32 |

NCB ARBITER REGISTER
(340)

| REGISTER | CREDITS |
|---|---|
| IOBN0_NCB0_CREDITS | 64 |
| IOBN0_NCB1_CREDITS | 32 |

IOBN REGISTER
(345)

ARBITRATED ACCESS TO RESOURCES AMONG MULTIPLE DEVICES

BACKGROUND

In certain data processing applications, multiple devices, such as processor cores and input/output interfaces, may require access to shared resources such as a memory. A resource arbiter can be implemented to arbitrate access to the shared resources. Typically, the arbiter selects a next device to allow to forward a resource request based on a predetermined routine, such as a round-robin selection among all of the devices.

SUMMARY

Example embodiments of the present disclosure include a circuit configured to manage and enforce arbitration and quality of service (QOS) among multiple devices accessing a resource, such as a memory. The circuit can include a device interface for receiving requests from a number of devices to access a memory, where each of the requests including a device identifier (ID) identifying the device. A bridge interface forwards the requests to a bridge, where they may be sent to the memory. A per-device counter maintains a resource count allocated to each device, and a bus counter maintains a resource count for forwarding the requests to the bridge via the bus. Further, an arbiter circuit operates to select a next one of the requests to forward to the bridge based on 1) the device identifier of the request, 2) a count of the per-device counter corresponding to the device identifier, and 3) a count of the bus counter.

In further embodiments, the per-device counter may limit a maximum resource count to a first of the plurality of devices relative to a second of the plurality of devices. The arbiter circuit may suspend requests having a given device identifier in response to detecting that the per-device counter for the given device identifier indicates a count that is less than a threshold value. The arbiter circuit may also suspend requests in response to detecting that the bus counter indicates a count that is less than a threshold value. For a given request, the arbiter circuit may suspend the request based on a) an indication of a resource count required by the request, and b) a predetermined threshold for per-request resources.

In still further embodiments, a number of buffers (e.g., FIFOs) may store the requests received from a respective device at the device interface. In response to reaching a threshold storage value, the buffers may generate a backpressure command to limit receipt of further requests to the circuit. The per-device counter may increment in response to receiving an indication that an additional resource associated with a given device identifier is available. Likewise, the bus counter may increment in response to receiving an indication that an additional resource associated with the circuit is available.

In yet further embodiments, a bridge control circuit may operate to control a count of the bus counter. In particular, the bridge control circuit may prevent the return of an initial given count of resources to the bus counter.

BRIEF DESCRIPTION OF THE DRAWINGS

The foregoing will be apparent from the following more particular description of example embodiments of the disclosure, as illustrated in the accompanying drawings in which like reference characters refer to the same parts throughout the different views. The drawings are not necessarily to scale, emphasis instead being placed upon illustrating embodiments of the present disclosure.

FIGS. 4A-B illustrate example register structures.

DETAILED DESCRIPTION

A description of example embodiments follows.

Figure 1:
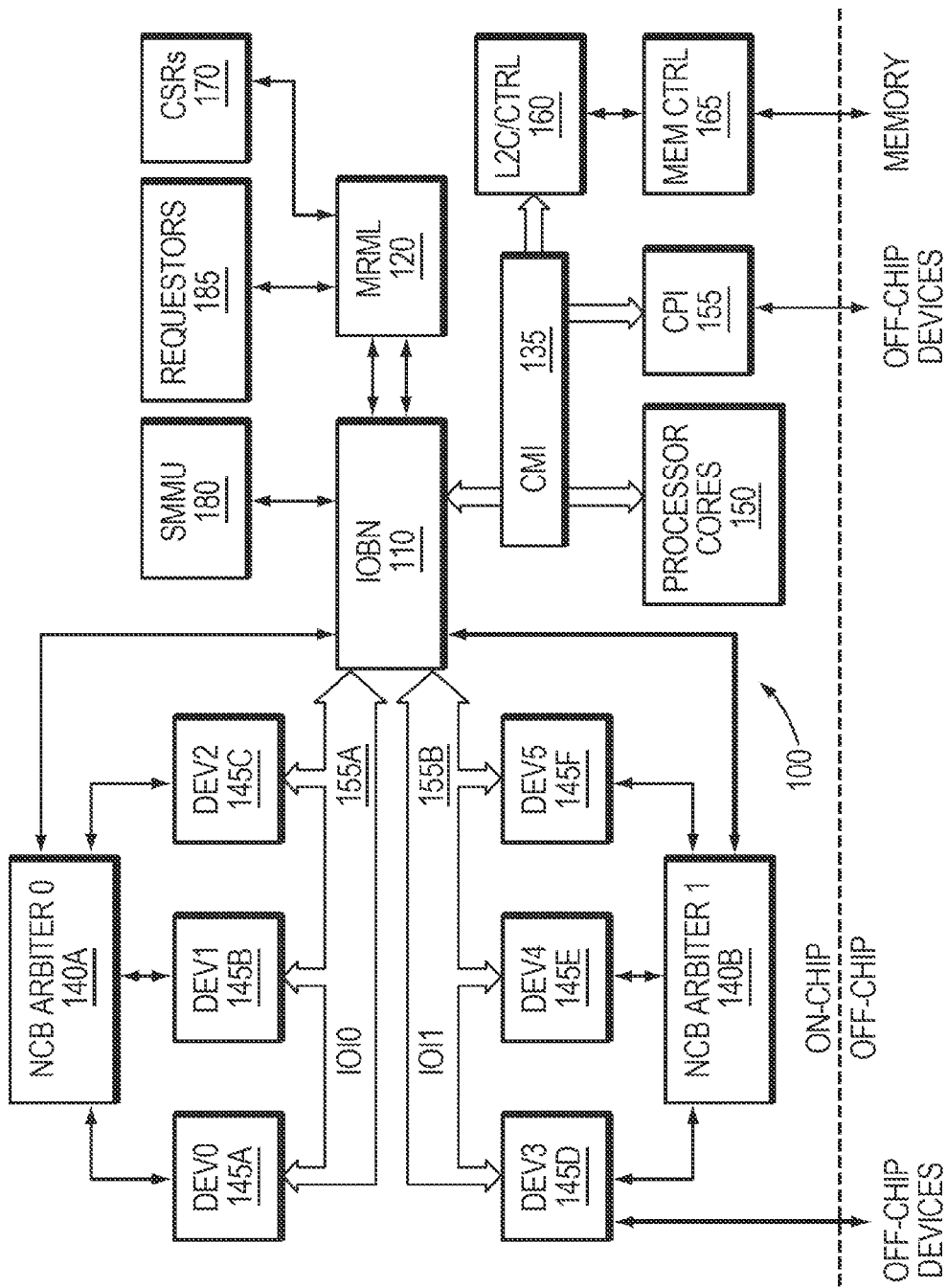
FIG. 1 is a block diagram illustrating a data processor in which embodiments of the present disclosure may be implemented.

FIG. 1 is a block diagram illustrating a data processor 100 in an example embodiment. The processor 100 may be implemented as a system-on-chip (SOC) and connected to external devices, resources and communications channels via a printed circuit board (PCB). Alternatively, the processor 100 may be implemented among a number of discrete circuit components connected via a PCB, or may comprise a SOC in combination with one or more discrete circuit components.

The data processor 100 facilitates operations between a number of devices and resources, and arbitrates access to shared resources among the devices. In particular, the processor cores 150 may include one or more data processor cores. In an example embodiment, the processor cores 150 may include a number (e.g., 48) of ARM® processor cores, such as the ARMv8 processor cores. The processor cores 150 are connected, via a coherent memory interconnect (CMI) 135, to provide shared access to a number of other devices and resources, including the level-2 cache (L2C) and controller 160 (also referred to herein as "L2C"). The L2C further connects to a memory controller 165 for performing memory access operations to an external memory, such as a double data rate synchronous dynamic random-access memory (DDR SDRAM) array. Such a memory (not shown) may alternatively be located on-chip with the data processor 100. The CMI 135 may also connect to a coherent processor interconnect (CPI) 155 for communication with off-chip devices, such as an additional data processor. An example of one such configuration is described below with reference to FIG. 2.

The CMI 135 is further connected to an input/output bridge (IOBN) 110, which provides an interconnect between the processor cores 150, CPI 155 and L2C 160 and additional devices and resources. In particular, devices 145A-F connect to the IOBN 110 via input/output interconnects (IOI), IOI0 155A and IOI1 155B, which may be noncoherent buses (NCBs) including passive and/or arbitrated channels. The devices 145A-F may include a number of different on-chip devices, such as co-processors, and may include I/O interfaces (e.g., USB, SATA, PCIe, Ethernet) to connect to a number of external or off-chip devices and interfaces. In order to arbitrate resources at the IOBN 110 to the devices 145A-F, NCB arbiters 140A-B receive requests from the devices 145A-F and selectively grant IOBN resources to the devices 145A-B. Once granted, the devices 145A-B may communicate with the processor cores 150, perform a memory access operation to the L2C 160, or access other components of the data processor 100.

In order to facilitate shared memory access among several different devices (e.g., the processor cores 150 and devices 145A-F), the data processor 100 may employ virtualization, whereby a memory interconnect (e.g., CMI 135 and IOBN 110) interfaces with the devices using virtual addresses, which are translated to a physical address of the memory. To enable virtualization, a System Memory Management Unit (SMMU) 180 maintains an index of physical and virtual addresses. During a memory access operation where a virtual address is provided, the IOBN 110 forwards the virtual address to the SMMU 180, which returns a corresponding physical address for accessing the memory (e.g., the L2C 160 or an external memory via the L2C 160). The IOBN 110 may translate addresses bi-directionally such that the virtual address is maintained at communications at the device, and the physical address is indicated in operations at the memory. The SMMU 180 may be further configured to support multiple tiers of virtual addresses.

Control status registers (CSRs) 170 include registers for maintaining information about the instructions and operations of the data processor 100. The CSRs may maintain, for example, status information regarding a number of devices, as well as information about ongoing operations and instructions between devices and/or resources. Devices such as the processor cores 150 and the devices 145A-B, as well as other requestors 185 and off-chip devices (via the CPI 155), may write to and read from the CSRs 170 using a register master logic (RML). To facilitate the multiple requests from several different devices, a master RML (MRML) 120 operates to arbitrate access to the CSRs 170.

Figure 2:
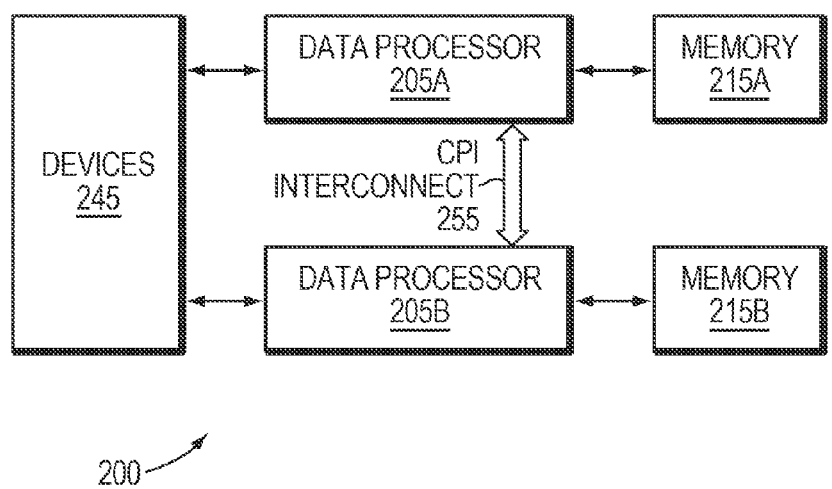
FIG. 2 is a block diagram illustrating a system implementing the data processor of FIG. 1.

FIG. 2 is a block diagram illustrating a system 200 implementing a plurality of data processors. The system 200 includes data processors 205A-B, each of which may be configured comparably to the data processor 100 described above with reference to FIG. 1. The data processors 205A-B may be linked by a CPI interconnect 255, which may connect to a respective CPI interface (e.g., 155 in FIG. 1) of each data processor 205A-B. The CPI interconnect 255 may provide shared access to the devices and resources across the data processors 201A-B. In further embodiments, additional data processors or other devices may be linked to the data processors 205A-B via the CPI interconnect 255.

The data processors 205A-B may be connected to respective memory arrays (e.g., DDR SDRAM) 215A-B as shown, and/or may be connected to a common memory array. The data processors may be further connected to a number of external devices 245 via a number of devices via respective I/O interfaces (e.g., USB, SATA, PCIe, Ethernet).

Turning back to FIG. 1, in some embodiments, multiple devices, such as the devices 145A-F and processor cores 150, may require access to shared resources such as the L2C 160. For the devices 145 A-F, the NCB arbiters 140A-B can be implemented to arbitrate access to the L2C 160 and/or other shared resources. The arbiter 140A, for example, grants resources to each of the devices 145A-C for forwarding request to the IOBN 110 via the IOI0 155A. To do so, the arbiter 140A may select a next device to allow to forward a resource request based on a predetermined routine, such as a round-robin selection among all of the devices 145A-C.

However, each of the devices 145A-F may utilize a different number of IOBN 110 resources, or may require greater priority over other devices. Further, devices on one bus (e.g., bus IOI 155A) may utilize a different number of resources, or require greater priority of resources, relative to devices on another bus (e.g., bus IOI 155B) As a result, without proper arbitration, some devices may receive an insufficient resources to forward requests to the IOBN 110, while other devices may utilize more resources than necessary.

NCB arbiters 140A-B, in one embodiment, may be configured to manage and enforce arbitration and quality of service (QOS) to the L2C 160 or other resources by a number of devices. The arbiters 140A-B receive requests from a number of devices 145A-F to use resources of a bridge IOBN 110 connecting to the L2C, and maintain a count of bridge resources available on a per-device and per-bus basis. The arbiters 140A-B operate to select a next one of the requests to grant a bridge resource based on the device originating the request, a count of the per-device resources available, and a count of the resources available to the bus connecting the device to the IOBN 110.

An example NCB arbiter 140A configured to provide the aforementioned functions is described below with reference to FIG. 3.

Figure 3:
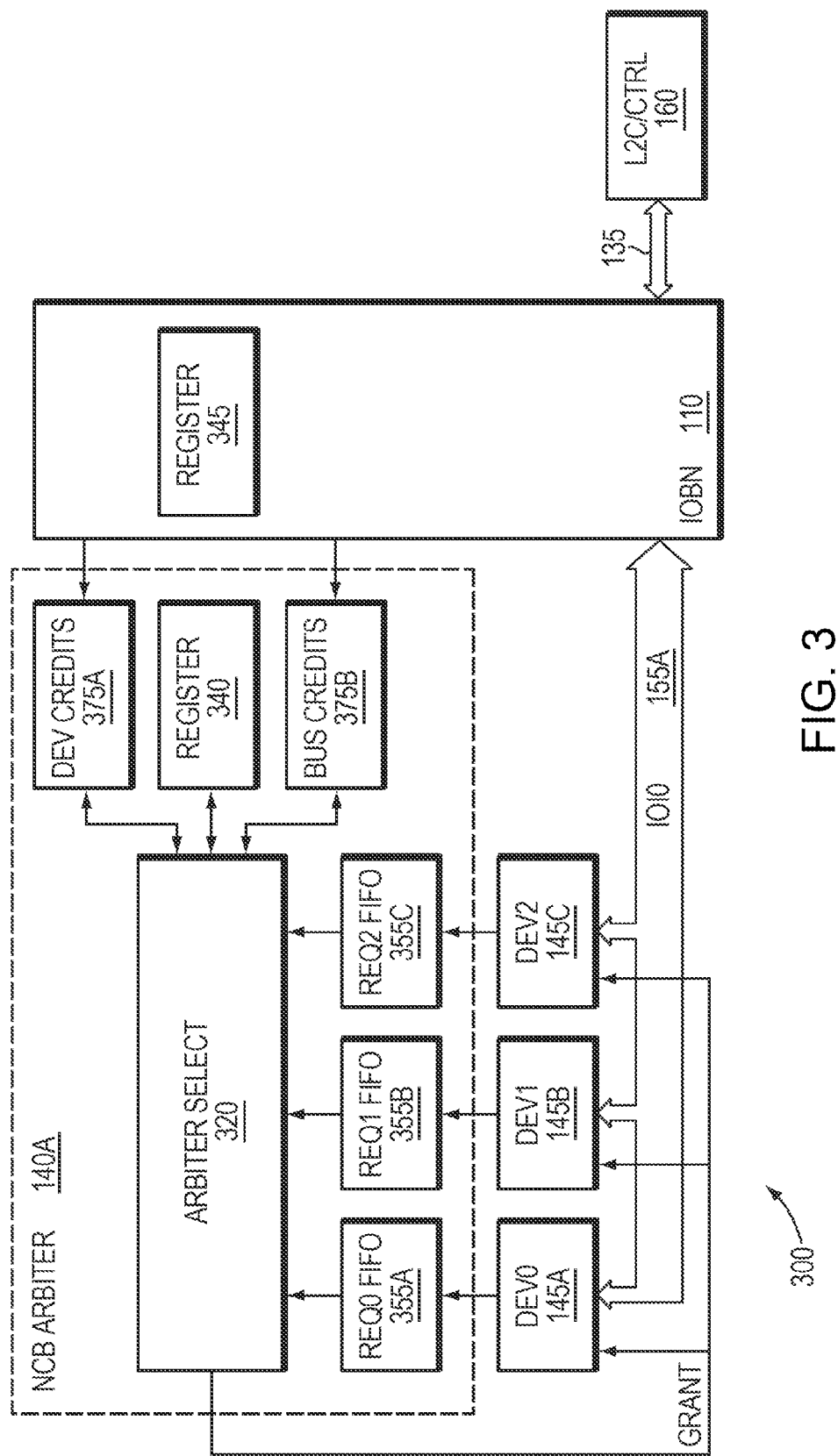
FIG. 3 is a block diagram illustrating an arbiter and bridge connecting a plurality of devices and a memory in one embodiment.

FIG. 3 is a block diagram illustrating a processing subsystem 300 including a NCB arbiter 140A and an IOBN 110 connecting a plurality of devices 145A-C and a memory (L2C 160) in one embodiment. The subsystem 300 may include one or more components of the data processor 100 described above with reference to FIG. 1, or may be incorporated into the data processor. For example, the subsystem 300 may also include processor cores 150 and process access requests from the processor cores 150 as well as from the devices 145A-C. Further, a second NCB arbiter 140B may be configured in a manner comparable to the NCB arbiter 140A as described below.

The devices 145A-C may forward memory access requests to the L2C 160 via the IOBN 110, for example to read or write to the L2C 160. The IOBN 110 may have a limited number of resources (e.g., available slots in a time-division multiplexing (TDM) channel at the CMI 135) available for handling such requests. The NCB arbiter 140A operates to arbitrate these resources among the devices 145A-C. To do so, the NCB arbiter 140A may receive requests for IOBN resources from each of the devices 145A-C via a respective buffer (e.g., FIFO) 355A-C. An arbiter select circuit 320 may select a next request to grant a resource based on a number of conditions. In particular, the select circuit 320 may reference a device credit counter 375A and/or a bus credit counter 375B.

The device credit counter 375A may maintain a number of per-device counters indicating a count of IOBN resources available to a respective device. The count of IOBN resources may be equivalent to a maximum (or initial) number of resources allocated to a given device, minus a number of in-flight requests associated with the device. To maintain this count, the device credit counter 375A may decrement a given count when a resource is granted to a corresponding device, and may increment a given count upon receiving an indication from the IOBN 110 that a corresponding request has been completed (e.g., cleared from the IOBN 110 or fulfilled by the L2C 160). The register 340 may store programmable values to be used by the device credit counter 375A as the maximum or initial count values for each device. As a result, the NCB arbiter 140A may configure a specific number of resources to each device 145A-C, which may ensure that devices receive a proper number of resources based on priority or other factors, and that the device requests from one device do not prevent another device from receiving a minimum number of resources. Alternatively, the register 340 may be located at the IOBN 110 or another location such as the control and status registers (CSRs) 170 shown in FIG. 1.

The bus credit counter 375B may maintain a counter indicating a count of IOBN resources available to all of the devices 145A-C connecting to the IOBN 110 via a common bus (IOI0 155A). The count of IOBN resources may be equivalent to a maximum (or initial) number of resources allocated to the IOI0 155A, minus a number of in-flight requests associated with the IOI0 155A. To maintain this count, the bus credit counter 375B may decrement a given count when a resource is granted to device on IOI0 155A, and may increment a given count upon receiving an indication from the IOBN 110 that a corresponding request has been completed (e.g., cleared from the IOBN 110 or fulfilled by the L2C 160). The register 345 at IOBN 110 may store programmable values to be used by the bus credit counter 375B as the maximum or initial count values for each device. As a result, the IOBN 110 may configure a specific number of resources allocated to all devices 145A-C connected to a common bus IOI0 155A, which may differ from a number of resources allocated to devices on another bus (e.g., devices 145D-F on IOI1 as shown in FIG. 1). Such a configuration can provide "bus balancing" among a number of buses, whereby each bus receives a proper number of resources based on priority or other factors, and that the device requests from one bus do not prevent devices at another bus from receiving a minimum number of resources. Alternatively, the register 345 may be located at the NCB arbiter 140A or another location such as the control and status registers (CSRs) 170 shown in FIG. 1.

To provide further bus balancing, the IOBN 110 may be configured to refrain from returning an initial number of credits to the bus credit counter 375B. For example, for the first given number (e.g., 8) of credits used by the devices 145A-C on a given bus IOI0 155A, the IOBN 110 may refrain from returning those credits to the bus credit counter 375B, while returning all credits following the initial number of credits. This configuration may be applied to some or all of the buses (e.g., IOI1 155B). A similar configuration may be applied to the per-device counts for one or more devices 145A-C.

FIGS. 4A-B illustrate example register structures. As shown in FIG. 4A, an NCB arbiter register 405 (e.g., register 340 in FIG. 3) may maintain a distinct credit value for each device. The credit value may be used to set an initial or maximum value at a respective counter of a device credit counter (e.g., counter 375A). As shown in FIG. 4B, an IOBN register 410 (e.g., register 345) may maintain a distinct credit value for each bus (e.g., IOI0, IOI1 155A-B). The credit value may be used to set an initial or maximum value at a respective counter of a bus credit counter (e.g., counter 375B).

Figure 5:
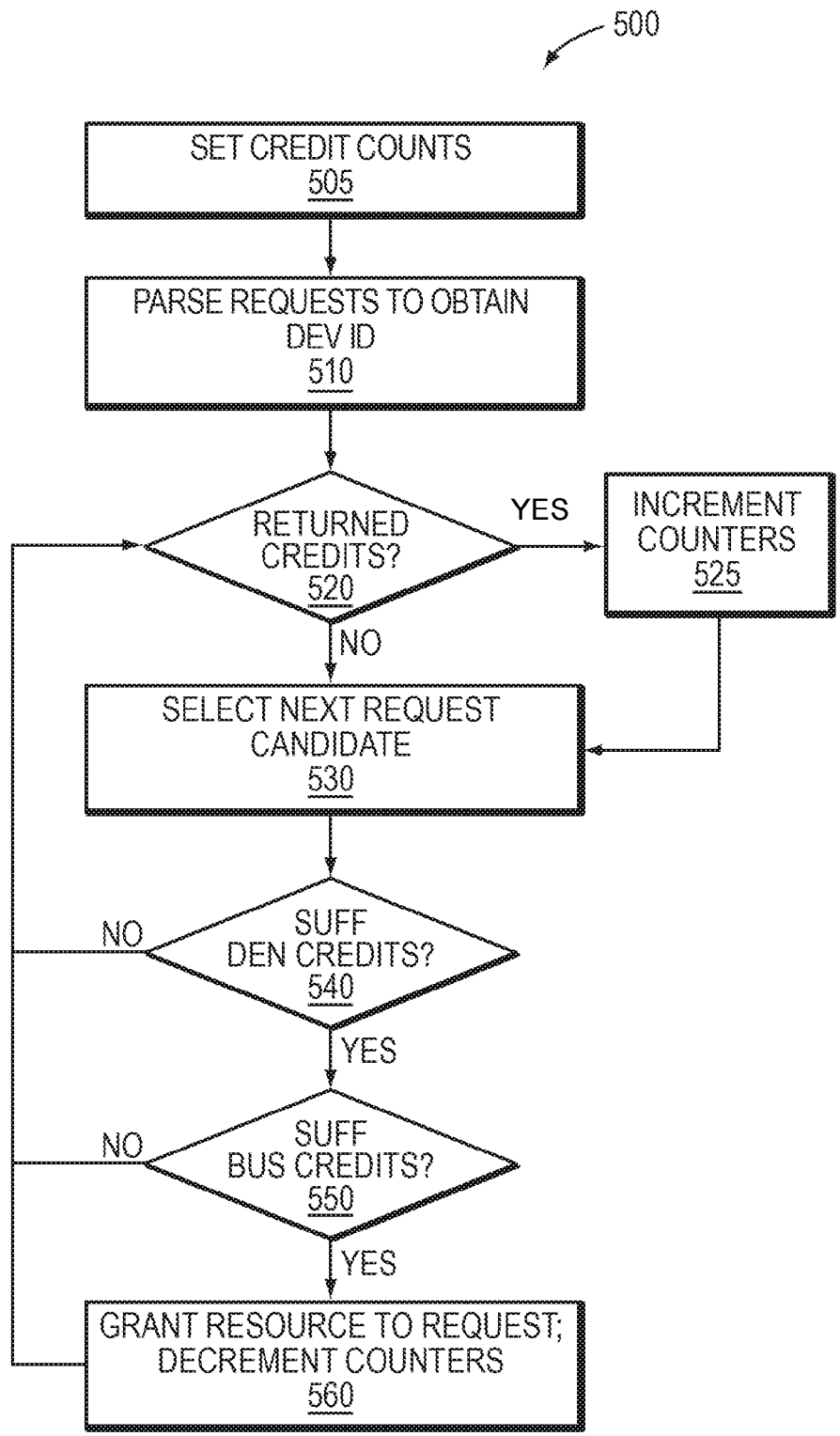
FIG. 5 is a flow chart illustrating arbitration of requests in one embodiment.

FIG. 5 is a flow chart illustrating a process 500 arbitrating requests in one embodiment. With reference to FIG. 3, upon initialization, the NCB arbiter 140A may set initial credit counts at the device credit counter 375A and the bus credit counter 375B based on values at the registers 340, 345, respectively (505). For each request for IOBN resources received at buffers 355A-C, the NCB arbiter 140A may parse the request to obtain a corresponding device identifier (ID) (510). To update the credit counts, the NCB arbiter 140A may periodically or continuously check for returned credits from the IOBN 110 (520). If credits are received, then the respective counter(s) are incremented accordingly (525).

To determine a next request to grant, the NCB arbiter 140A may first select a next request candidate according to a selection routine (e.g., a round-robin selection) (530). For the selected candidate, the NCB arbiter 140A may look up an associated device credit count (at device credit counters 375A) based on the device ID of the candidate (540), and may look up an associated bus credit count (at device credit counter 375B) for the bus (e.g., IOI 155A) connected to the device (550). If one of the device credit count or bus credits count does not have a sufficient or threshold number of credits, then the NCB arbiter 140A may suspend the request an proceed to select a next request candidate (530). If, however, both the device credit count and the bus credit count have a sufficient number of credits, the NCB arbiter 140A may grant a resource to the request and decrement the counters associated with the request accordingly (560). The NCB arbiter may then proceed to repeat the operations of updating the credit counts (520) and selecting a next request candidate to grant resources (530).

While this invention has been particularly shown and described with references to example embodiments thereof, it will be understood by those skilled in the art that various changes in form and details may be made therein without departing from the scope of the invention encompassed by the appended claims.

What is claimed is:

1. A circuit comprising:
    a device interface for receiving requests from a plurality of devices to access a memory via a bridge, each of the requests including a device identifier;
    a per-device counter configured to maintain a device resource count allocated to each device, the device resource count indicating a quantity of resources available at the bridge for processing the requests from the device;
    a bus counter configured to maintain a bus resource count for forwarding the requests to the bridge via a bus, the bus resource count indicating a quantity of resources available at the bridge for processing the requests from the bus; and
    an arbiter circuit configured to select a next one of the plurality of requests to forward to the bridge based on 1) the device identifier of the request, 2) the device resource count corresponding to the device identifier, and 3) the bus resource count associated with the device identifier.

2. The circuit of claim 1, wherein the per-device counter is further configured to limit a maximum resource count to a first of the plurality of devices relative to a second of the plurality of devices.

3. The circuit of claim 1, wherein the arbiter circuit is further configured to suspend requests having a given device identifier in response to detecting that the per-device counter for the given device identifier indicates a count that is less than a threshold value.

4. The circuit of claim 1, wherein the arbiter circuit is further configured to suspend requests in response to detecting that the bus counter indicates a count that is less than a threshold value.

5. The circuit of claim 1, wherein the arbiter circuit is further configured to suspend one of the requests based on a) an indication of a resource count required by the request, and b) a predetermined threshold for per-request resources.

6. The circuit of claim 1, further comprising a plurality of buffers each configured to store the requests received from a respective device at the device interface.

7. The circuit of claim 6, wherein each of the plurality of buffers generates a backpressure command in response to reaching a threshold storage value.

8. The circuit of claim 1, wherein the per-device counter is further configured to increment in response to receiving an indication that an additional resource associated with a given device identifier is available.

9. The circuit of claim 1, wherein the bus counter is further configured to increment in response to receiving an indication that an additional resource associated with the circuit is available.

10. The circuit of claim 1, further comprising a bridge control circuit, the bridge control circuit configured to control a count of the bus counter.

11. The circuit of claim 10, wherein the bridge control circuit is further configured to prevent return of an initial given count of resources to the bus counter.

12. A method comprising:
  receiving requests from a plurality of devices to access a memory via a bridge, each of the requests including a device identifier;
  maintaining a per-device resource count allocated to each device, the per-device resource count indicating a quantity of resources available at the bridge for processing the requests from the device;
  maintaining a bus resource count for forwarding the requests to the bridge via a bus, the bus resource count indicating a quantity of resources available at the bridge for processing the requests to the bridge via the bus; and
  selecting a next one of the plurality of requests to forward to the bridge based on a) the device identifier of the request, b) the per-device resource count corresponding to the device identifier, and c) the bus resource count associated with the device identifier.

13. The method of claim 12, further comprising limiting, via the per-device resource count, a maximum resource count to a first of the plurality of devices relative to a second of the plurality of devices.

14. The method of claim 12, further comprising suspending requests having a given device identifier in response to detecting that the per-device resource count for the given device identifier indicates a count that is less than a threshold value.

15. The method of claim 12, further comprising suspending requests in response to detecting that the bus resource count indicates a count that is less than a threshold value.

16. The method of claim 12, further comprising suspend one of the requests based on a) an indication of a resource count required by the request, and b) a predetermined threshold for per-request resources.

17. The method of claim 12, further comprising storing the requests received from a respective device at a device interface.

18. The method of claim 17, further comprising generating a backpressure command in response to reaching a threshold storage value.

19. The method of claim 12, further comprising incrementing the per-device resource count in response to receiving an indication that an additional resource associated with a given device identifier is available.

20. The method of claim 12, further comprising incrementing the bus resource count in response to receiving an indication that an additional resource associated with the circuit is available.

21. The method of claim 12, further comprising controlling the bus resource count via a signal from the bridge.

22. The method of claim 21, further comprising preventing return of an initial given count of resources to the bus resource count.

* * * * *